United States Patent [19]

Bacskai

[11] 4,125,523

[45] Nov. 14, 1978

[54] CATALYST FOR POLYMERIZATION OF 2-PYRROLIDONE

[75] Inventor: Robert Bacskai, Kensington, Calif.

[73] Assignee: Chevron Research Company, San Francisco, Calif.

[21] Appl. No.: 794,446

[22] Filed: May 6, 1977

Related U.S. Application Data

[63] Continuation of Ser. No. 585,909, Jun. 11, 1975, abandoned.

[51] Int. Cl.$^2$ ............................................. C08G 69/24
[52] U.S. Cl. ................................ 528/312; 252/431 C; 252/431 N; 260/326.5 FL; 260/326.5 FN; 528/326
[58] Field of Search .......................... 260/78 P, 78 L

[56] References Cited

U.S. PATENT DOCUMENTS

| | | | |
|---|---|---|---|
| 2,638,463 | 5/1953 | Ney et al. | 260/78 P |
| 2,854,458 | 9/1958 | Reppe et al. | 260/239.3 R |
| 3,346,566 | 10/1967 | Chiddix et al. | 260/239.3 R |
| 3,647,764 | 3/1972 | Sargent | 260/78 P |
| 3,696,075 | 10/1972 | Matzner et al. | 260/78 P |
| 3,700,656 | 10/1972 | Masaki et al. | 260/239.3 A |
| 3,721,652 | 3/1973 | Barnes | 260/78 P |
| 3,842,047 | 10/1974 | Pusztaszeri | 260/78 P |
| 3,865,814 | 2/1975 | Lussi et al. | 260/239.3 R |

Primary Examiner—Harold D. Anderson
Attorney, Agent, or Firm—Dix A. Newell; T. G. DeJonghe; Lawrence S. Squires

[57] ABSTRACT

In an improved process for making catalyst for the alkaline-catalyzed polymerization of 2-pyrrolidone, potassium metal is contacted with a 5–7 membered-ring lactam and the product, potassium lactamate, is substantially isolated. The potassium lactamate so-derived finds use as a catalyst in the polymerization of 2-pyrrolidone or may be contacted with carbon dioxide to form an isolatable adduct which is used as an activator in the polymerization of 2-pyrrolidone.

3 Claims, No Drawings

CATALYST FOR POLYMERIZATION OF 2-PYRROLIDONE

This application is a continuation of application Ser. No. 585,909 filed June 11, 1975 now abandoned.

BACKGROUND OF THE INVENTION

The conventional polymerization of 2-pyrrolidone is performed in the presence of a catalyst system composed of an alkaline catalyst and a small amount of polymerization initiator. Recent prior art teaches repeatedly that an alkali metal in metallic form should not be used as the source of the alkaline catalyst system (U.S. Pat. Nos. 3,721,652, 3,683,046, 3,682,869, 3,681,296, 3,681,295 and 3,681,293) because it gives a catalyst system which is deleterious to the polymerization reaction. On the other hand, the same prior art teaches that alkali metal derivatives, such as the hydroxides, are suitable sources of alkaline polymerization cataylst. For example, the use of a sodium metal-derived catalyst system has been shown to produce a low yield (3.2%) of low-molecular-weight polymer unsuitable for melt spinning, while potassium hydroxide-derived catalyst systems produce, in good yield, a polymer suitable for melt spinning.

The unsuitability of the metallic alkali metals for catalyst preparation has been ascribed to reduction of the sensitive 2-pyrrolidone ring by these very strong metallic reducing agents ($K=K^+ +e^-$, $E^o=2.925$ volts and $Na=Na^{30} +e^-$, $E^o=2.714$ volts relative to $H_2=2H+2e^-$, $E^o=0.0$ volts, see Latimer and Hildebrand, "Reference Book of Inorganic Chemistry", 3d Ed., MacMillian, p. 528). On this basis alone, potassium metal should be an even more deleterious source of the alkaline catalyst system than sodium metal. Furthermore, the alkali metal-derived catalysts are said to be difficult, or even impossible, to purify and are said to lose catalytic activity with time (see U.S. Pat. 3,835,100, Cols. 1 and 9).

SUMMARY OF THE INVENTION

An improved process for making catalyst for the alkaline-catalyzed polymerization of 2-pyrrolidone includes the steps of contacting metallic potassium with a 5-7 membered-ring lactum and substantially isolating the product potassium lactamate. The isolated potassium lactamate is added to 2-pyrrolidone in amounts of from 0.5 to 30 mol percent based on total 2-pyrrolidone in order to effect polymerization at a temperature of about 15° C to about 100° C for a period of about 4 to about 100 hours.

DESCRIPTION OF PREFERRED EMBODIMENTS

In embodiments of this invention, metallic potassium is contacted with a lactum, preferably 2-pyrrolidone, to form a mixture containing the salt, potassium lactamate. For example, the reaction between potassium and 2-pyrrolidone proceeds according to the following equation:

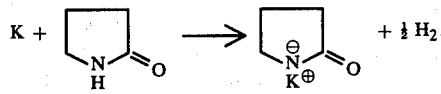

The reaction is observed to generate hydrogen gas. The analogous reaction occurs between sodium and 2-pyrrolidone. The process has been carried out in the prior art by slowly adding less than an equivalent amount of metal to the lactam (i.e., excess lactam) to produce a solution of alkali metal lactamate in the lactam. My work confirms that this catalyst solution produced from alakali metal (with or without the addition of a polymerization activator or initiator such as carbon dioxide) is generally an unsatisfactory catalyst for the polymerization of 2-pyrrolidone.

Surprisingly, I find that the substantial isolation of the lactamate from this solution yields a satisfactorily effective catalyst if the alkali metal is potassium, but the same technique yields a less satisfactory catalyst if the alkali metal is sodium. Yet, other sodium-derived catalysts, such as sodium pyrrolidonate derived from sodium alkoxide, or from sodium hydroxide, are found to be satisfactorily effective catalysts for the polymerization of 2-pyrrolidone. No reason is presently known for the difficulty in obtaining as effective a catalyst from sodium metal as can be obtained from potassium metal by the process of this invention. This is especially difficult to understand in view of the greater reducing potential of potassium.

In the process of this invention "substantially isolating" a catalyst is defined as subjecting same to a process of mechanical separation such as filtration, decantation or centrifugation.

In an embodiment of the process of this invention, substantial isolation of potassium pyrrolidonate is achieved by the addition of an equivalent amount or less than an equivalent amount of potassium metal to 2-pyrrolidone dissolved in a substantially anhydrous nonsolvent for potassium pyrrolidonate such as benzene. An exothermic reaction between potassium and 2-pyrrolidone is observed. If too large an excess of 2-pyrrolidone (in which potassium pyrrolidonate is soluble) is not present, a precipitate forms, e.g, an approximately equivalent amount of potassium and 2-pyrrolidone in a nonsolvent for potassium pyrrolidonate readily forms a precipitate. The resulting white precipitate, potassium pyrrolidate, can be isolated practically quantitatively by filtration. Normally, 1:1–50 mol; ratio potassium: 2-pyrrolidone is used. 2-pyrrolidone is normally dissolved in 50–1000 volume percent of a nonsolvent for potassium pyrrolidonate such as liquid aliphatic and aromatic hydrocarbons, preferably monocyclic aromatic hydrocarbons of at least 6 carbon atoms such as benzene and toluene. The precipitated potassium pyrrolidonate can be isolated immediately [as a precipitate], or it can be further reacted as a slurry in whole or in part with an added polymerization initiator such as $CO_2$ or $SO_2$, to form an adduct which remains insoluable in the presence of said nonsolvent. The adduct, which in the case of $CO_2$ is believed to be potassium N-carboxypyrrolidonate, or the mixture of the adduct and potassium pyrrolidonate, is then isolated by filtration. Carbon dioxide or sulfur dioxide are noramlly added to potassium pyrrolidonate in amounts of about 5–60 mol percent based on potassium pyrrolidonate.

In order to produce high-quality poly-2-pyrrolidone capable of being formed into fibers, filaments and yarn of commercial textile quality, it is necessary that the 2-pyrrolidone monomer be of high purity. Depending upon the process of manufacture, commercially available 2-pyrrolidone may contain appreciable amounts of various impurities, some of which are believed to interfere deleteriously with polymerization. Purification of the monomer to polymerization grade is achieved by crystallization; distillation; distillation from a boron oxide, as disclosed in U.S. Pat. No. 3,806,427; aqueous caustic hydrolysis and distillation, as disclosed in U.S. Pat. No. 3,721,652; acid treatment and distillation, as disclosed in U.S. Pat. No. 3,721,652; and these and other purification techniques in combination. All the experiments reported hereinbelow were performed on 2-pyrrolidone monomer of high purity.

The process of the present invention is just as applicable to the production of catalysts for the polymerization of C-alkyl-substitued pyrrolidone, such as 4-methyl-2-pryylidone, and copolymers of 2-pyrrolidone, such as with caprolactam, as to the production of catalysts for the polymerization of 2-pyrrolidone. Consequently, in general, and unless otherwise indicated, the words "monomer" and "2-pyrrolidone" are interchangeable, and "monomer" also denotes 2-pyrrolidone, substitued 2-pyrrolidone, and any compound capable of copolymerizing with 2-pyrrolidone under the stated conditions of alkaline polymerization catalysts.

The polymerization of 2-pyrrolidone is usually carried out in the presence of an activator (initiator) of polymerization. Many types of initiators have been suggested, including acyl derivatives, U.S. Pat. No. 2,739,959; N-acyl lactams, U.S. Pat. No. 2,809,958; oxides of Group VI such as $SO_2$, U.S. Pat. No. 3,174,951; halides and oxyhalides, halòsilanes, $CS_2$, amides, sulfoamides, isocyanates, $NO_2$, carbonyl halides, etc. Of these, the preferred initiators are $SO_2$, or are derived from $SO_2$ or $CO_2$. $CO_2$ is most preferred (U.S.) Pat. No. 3,721,652). Of course, mixed initiators may also be utilized.

The total alkaline polymerization catalyst comprises from about 0.5 to 30 mol percent, or higher, of the monomer-catalyst mixture (the polymerizate). The mol percent of catalyst is based on total monomer. Total monomer consists of 2-pyrrolidonate catalyst, 2-pyrrolidone provided as solvent for said catalyst, 2-pyrrolidonate catalyst having formed an adduct with the initiator, and any additional monomer charged to the reactor. Preferably about 5-20 mol percent total alkaline polymerization catalyst, and most preferably about 10 mol percent catalyst, is used.

A polymerization initiator is normally used in amounts sufficient to effect substantial conversion and reasonable yields of high-viscosity polymer in a reasonable period of time. Up to 0.2 mol of initiator per mol of monomer is used, but normally about 0.02-10 mol percent of initiator, based on total monomer, is perferred, and about 1-5 mol percent is most preferred. When used as co-initiators in combination with carbon dioxide, such compounds as N-acyl pyrrolidone, phthalic anhydride, pyromellitic dianhydride, $CS_2$, ethylene carbonate and trifluoromethane sulfonic anhydride, in amounts of about 0.01-0.02 mol percent, based on toal monomer, may accelerate the polymerization of 2-pyrrolidone. In general, whether the catalyst is produced in situ, or catalyst and initiator are made and added separately, the reaction mixture comprises about 5-60 mol percent initiator based on total catalyst.

The polymerization of 2-pyrrolidone is carried out at a temperature of from about 15° to about 100° C, preferably 25° C to 70° C, and most preferably from about 40° C to about 60° C, under a pressure ranging from subatomospheric to superatmospheric, in the presence of the alakline polymerization catalyst for a period from about 4 to 100 hours or longer, preferably from about 8 to about 72 hours, more preferably from about 8 to about 48 hours. Substantially anhydrous polymerization conditions are preferred.

EXEMPLIFICATION

Examples 1-5 deal with the isolation and/or use of sodium-derived catalysts for the polymerization of 2-pyrrolidone, and Examples 6-12 deal with the isolation and/or use of potassium-derived catalysts for the polymerization of 2-pyrrolidone.

EXAMPLE 1

This example is illustrative of the isolation of sodium pyrrolidonate and sodium pyrrolidonate/sodium N-carboxypyrrolidonate catalysts derived from sodium metal.

(1a) To a solution of 21.39 g of purified monomer in 125 ml of benzene was added 14.37 g of a 40% dispersion of sodium in mineral oil over a period of 1.5 hours at a temperature of 40°-59° C. 2.06 g of monomer was additonally added. The mixture was diluted in 100 ml of benzene, filtered, and the solid product washed with two 100-ml portions of benzene, two 100-ml portions of hexane and two 50-ml portions of ether. The solid product, sodium pyrrolidonate, was dried at room temperature in a desiccator. The yield was 24.33 g.

(1b) To a solution of 21.37 g of purified monomer in 125 ml of benzene was added 14.37 g of a 40% dispersion of sodium in mineral oil over a period of 130 minutes at a temperature of from 40°-59° C. 2.12 g of additional monomer was added. The mixture was transferred to a distillation unit and 25 ml of benzene was added. After 25 ml of benzene was distilled off, the mixture was cooled to 30° C, and $CO_2$ bubbled in for 14 minutes. An exothermic reaction was observed in which the temperature of the mixture rose from 30 to 47° C. The mixture was diluted with 100 ml of benzene, filtered on filter paper and the solid washed with two 100-ml portions of benzene, two 100-ml portions of hexane and two 50-ml portions of ether. The product was dried in a desiccator (aspirator) and the yield was 31.72 g of a mixture of sodium pyrrolidonate and the adduct of $CO_2$ and sodium pyrrolidonate in a mol ratio of 5:4 respectively.

EXAMPLE 2

This example is illustrative of the polymerization results obtained from isolated sodium metal-derived catalysts.

(2a) Mixed in a polyethylene bottle were 45 g of purified monomer, 6.03 g of the isolated catalyst of Example 1b (17.6 mM of sodium pyrrolidonate-$CO_2$ adduct and 22.1 mM of sodium pyrrolidonate) and 2.03 g of the isolated catalyst of Example 1b (18.9 mM of sodium pyrrolidonate). The catalysts were weighed out in a dry box. The polymerizate, consisting of about 90 mol percent monomer, 3 mol percent $CO_2$ adduct and 7 mol percent sodium pyrrolidonate, ws held at 50° C for 22 hours. The yield was 0.06 g of polymer, which is only 0.12% conversion of monomer.

(2b) A polymerizate was made up identically as in Example 2a in a flask and heated to incipient distillation and cooled to 30° C before being poured into a polyethylene bottle. The polymerizate was held at 50° C for 22 hours. The yield was 1.88 g of polymer, corresponding to only 4.23% conversion of monomer. The polymer viscosity on the Gardner scale was less than A.

(2c) A polymerizate, made up identically as in Example 2a but containing 55 g of purified monomer, was heated under reduced pressure to distill off 9.12 g (16.4%) at a pot temperature of 188° C and a head temperature and pressure of 92° C/2mm. The polymerizate was poured into a polyethylene bottle and polymerized for 22 hours at 50° C. The yield was 3.84 g of polymer having a viscosity on the Gardner scale less than A and corresponding to 8.38 percent conversion of monomer.

EXAMPLE 3

This example illustrates that a satisfactory sodium-derived catalyst for the polymerization of 2-pyrrolidone can be obtained from a sodium compound.

(3a) 21.6 g of sodium methoxide, $NaOCH_3$, was dissolved in 200 ml of benzene and 20 ml distilled off. Distillation continued with the addition of 37.45 g of purified 2-pyrrolidone over a 17-minute period. Distillation then continued until there was no longer methanol in the distillate. The total distillate was 151 ml. 180 ml of benzene was added and the mixture cooled to 30° C. $CO_2$ was bubbled in for 25 minutes. The exothermic reaction raised the temperature to 42° C. The solid product was filtered washed with three 100-ml portions of benzene and two 100-ml portions of pentane and dried in a vacuum desiccator at room temeprature overnight. The yield was 47.33 g of a mixture of sodium pyrrolidonate/sodium carboxypyrrolidonate in a molar ratio of 1:0.55 respectively, based on nitrogen analysis.

(3b) To 45 g of purified monomer was added 6.8 g of the isolated catalyst of Example 3a. The catalyst had been stored and weighed under dry conditions. The polymerizate was shaken and held at 50° C for 22 hours. The polymer yield was 19.37 g, corresponding to 40.8% monomer conversion and had a viscosity on the Gardner scale of X–Y.

(3c) The catalyst of Example 3a was stored in a dry box for one week. 6.8 g of the catalyst was then mixed with 45 g of purified monomer and polymerized as in Example 3b. The yield was 19.08 g of polymer having a Gardner viscosity of Y, corresponding to 39.6% conversion of monomer.

EXAMPLE 4

This example shows that satisfactory catalyst for the polymerization of 2-pyrrolidone can be derived from sodium hydroxide by the conventional in situ preparation method.

50 g of purified monomer was contacted with 2.36 g of sodium hydroxide (98.2%) and heated at 106° C under reduced pressue for 29 minutes to dissolve the hydroxide. The clear solution was then heated to incipient distillation in 7 minutes at a pot temperature of 115° C and a head temperature of 80° C at 2.5 mm Hg. The mixture was cooled to 30° C and a calibrated amount of $CO_2$ was added to produce a 7:3 molar mixture of sodium pyrrolidonate and sodium pyrrolidonate-$CO_2$ adduct in 2-pyrrolidone solution. The solution was poured into a polyethylene flask and heated at 50° C for 22 hours. The polymer yield was 15.14 g, having a viscosity on the Gardner scale of U–V and corresponding to 35.26% conversion of monomer.

EXAMPLE 5

The following results illustrate the poor polymer yields obtained from in situ sodium metal-derived catalysts.

(5a) 1.35 g of sodium was added to 60 g of purified monomer. The sodium was added in small portions which had been cut up under pentane. The sodium dissolved slowly. After 20 hours of stirring at room tempertaure, stirring was continued at 40° C in an oil bath for 4 hours to complete dissolution of the sodium. A fine white precipitate was noted. 10.06 g. of the solution was distilled off under reduced pressure (pot temperature 105° C, head temperature and pressure, 95° C/1–1.5 mm). The residue was cooled to 30° C and a calibrated amount of $CO_2$ gas equivalent to 3 mol percent based on total monomer was added. The solution was heated at 50° C for 22 hours, yielding 5.61 g of polymer, which represented 12.7% monomer conversion.

(5b) 1.38 G of sodium was added in small portions to 80 g of purified monomer at 40°–46° C (oil bath) over 4.5 hours. Some precipitate was formed. After dissolution, 31.34 g (39%) of the solution was distilled off under reduced pessure (pot temperture 112° C, head temperature and pressure 104° C/2mm). The residue was cooled to 30° C and 3 mol percent (based on total monomer) of $CO_2$ gas was added. The solution was polymerized for 22 hours at 50° C, yielding 6.72 g of polymer having a viscosity on the Gardner scale of D and corresponding to 16.15% monomer conversion.

(5c) 1.39 g of sodium was added to 50 g of purified monomer as in (5b) in 5.5 hours at 38°–45° C, but there was no distillation. The same molar ratio of $CO_2$ was added and the solution polymerized for 22 hours at 50° C, yielding 0.15 g of polymer, which corresponded to 0.35% conversion of monomer.

EXAMPLE 6

The following results show the appreciable, but not substantial, differences in polymer yields which are obtained from the use of, in situ, unisolated potassium hydroxide-derived catalysts and isolated potassium hydroxide-derived catalysts.

(6a) 200 g of purified monomer was contacted with 15.5 g of potassium hydroxide pellets (85.2% KOH) in a stirred reactor and the mixture heated to incipient distillation over a period of 16 minutes under reduced pressure (pot temperature 120° C, head temperature and pressure 95° C/1mm). 3 mol percent based on total monomer of $CO_2$ was added and 130.94 g of the solution was polymerized at 50° C for 22 hours, yielding 60.4 g of polymer having a viscosity on the Gardner scale of $Z_2$ and corresponding to 49.19% conversion of monomer.

(6b) 110 g of purified monomer was contacted with 10 g of potassium hydroxide pellets (85.2% KOH) and heated to incipient distillation under reduced pressure for 13 minutes. The solution was cooled to 35° C and the vacuum replaced with nitrogen. 250 ml of dried benzene was added and $CO_2$ was bubbled through the solution for 25 minutes. The precipitate was filtered, washed with benzene and hexane, and dried in a vacuum desiccator. The yield was 25.86 g of potassium pyrrolidonate-$CO_2$ adduct.

(6c) 48.5 g of purified monomer was contacted with 2.71 g of potassium hydroxide pellets (85.2% KOH) and the mixture heated to incipient distillation under reduced pressure. After cooling to 30° C the solution was poured into a polyethylene bottle containing 2.94 g of the isolated $CO_2$ adduct of (6b)

and shaken to dissolve. The polymerizate was heated for 22 hours at 50° C, yielding 24.67 g of a polymer having a viscosity on the Gardner scale of $Z_1$ and corresponding to 53.3% conversion of monomer.

EXAMPLE 7

This example illustrates the unsatisfactory yield obtained from potassium metal-derived catalyst in the absence of a step achieving substantial isolation of that catalyst.

To 50 g of purified monomer was added 2.29 g of potassium (weighed and cut under pentane) over a period of about 20 minutes. The potassium dissolved with some gas evolution, forming a colorless, cloudy solution. 3 mol percent of $CO_2$ was added and then the solution was polymerized for 22 hours at 50° C. The yield was 6.99 g of polymer having a viscosity on the Gardner scale of B and corresponding to 15.1 percent monomer conversion.

The following examples show the substantial improvement in polymerization yield obtainable by substantial isolation of the potassium metal-derived catalyst.

EXAMPLE 8

This example illustrates the isolation of the potassium metal-derived catalyst by precipitation from a nonsolvent for potassium pyrrolidonate.

(8a) To 20.68 g of purified monomer dissolved in 125 ml of dry benzene was added 9.47 g of potassium metal (cut under pentane) at 40° C over a period of 5.25 hours. The reaction was exothermic, and 25 ml of additional benzene was added to facilitate stirring. An additional 5.16 g of monomer was also added, making a 25 mol percent excess of pyrrolidone. The precipitate was filtered, washed with benzene, hexane and ether and dried in a desiccator (aspirator) at room temperature. The yield was 31.33 g of a hygroscopic white powder, potassium pyrrolidonate.

(8b) 9.77 g of potassium metal was reacted with 24 mol percent excess monomer as in Example 8a. $CO_2$ was bubbled into the suspension of potassium pyrrolidonate in benzene and excess monomer at 30° C for 25 minutes. The solid precipitate was filtered, washed with two 100-ml portions of benzene, two 100-ml portions of hexane, and two 50-ml portions of ether, and dried in a vacuum desiccator. The yield was 35.76 g of a hygroscopic white powder. The molar composition of the product was 54.9% potassium pyrrolidonate and 45.1% of the $CO_2$ adduct of potassium pyrrolidonate. One gram of the product contained 0.47 g (3.8 mM) of potassium pyrrolidonate and 0.53 g (3.2 mM) of the adduct.

EXAMPLE 9

This example illustrates the satisfactory polymerization yields obtainable from an isolated catalyst derived from potassium metal.

(9a) 45 g of purified monomer, 2.47 g of the catalyst of Example 8a and 5.52 g of the catalyst of Example 8b were weighed into a polyethylene bottle in a dry box and shaken. The mixture was heated at 50° C for 22 hours, yielding 24.03 g of polymer having a viscosity on the Gardner scale of X-Y, corresponding to 49.26% monomer conversion.

(9b) In a separate experiment, the same polymerizate as in Example 9a was heated to incipient distillation (pot temperature 115° C, head temperature and pressure 90° C/2.5 mm) for 9 minutes. It was cooled to 30° C and poured into a polyethylene bottle. The polymerizate was heated at 50° C for 22 hours, yielding 25.0 g of a polymer having a viscosity on the Gardner scale of X-Y and corresponding to 55.35% conversion of monomer.

(9c) In another experiment 55 g of a purified monomer was mixed in a flask under nitrogen with 2.47 g of the catalyst of Example 8a and 5.22 g of the catalyst of Example 8b. 23.5% of the mixture was distilled off under vacuum (pot temperature 118° C, head temperature and pressure 100° C/3.5 mm). The solution was cooled to 30° C and poured into a polyethylene bottle. The polymerizate was heated to 50° C for 22 hours, yielding 22.66 g of polymer having a viscosity on the Gardner scale of X-Y and corresponding to 56.93% conversion of monomer.

These results are summarized in Tables I and II. All polymerizations were carried out for 22 hours at 50° C. Percent conversion is calculated as grams of polymer times 110/total monomer in grams. Viscosity is measured on the Gardner Scale.

Polymer viscosity is measured at room temperature (about 25° C) on the Gardner Viscosity Scale using a Gardner-Holdt Bubble Viscometer. 0.5 g of polymer is dissolved in 10 ml of concentrated formic acid (90% by weight HCOOH, 10% water). The polymer solution is compared in viscosity to the Gardner Bubble Standards, e.g., Standard U corresponds to 6.27 stokes, Standard Z corresponds to 22.7 stokes ("Physical and Chemical Examination, Paints, Varnishes, Lacquers and Colors by H. A. Gardner and G. G. Sward, 12th Ed., 1962, distributed by Gardner Laboratory Company, Inc., Bethesda, Md).

TABLE I

POLYMERIZATION OF PYRROLIDONE WITH SODIUM-DERIVED CATALYST

| Example | Catalyst Source | Catalyst Preparation | Treatment of Polymerizate | Product Percent Conversion | Viscosity |
|---|---|---|---|---|---|
| 4 | NaOH | In Situ | Incipient Distillation | 35.3 | U - V |
| 3b | $NaOCH_3$ | Isolated | None | 40.8 | X - Y |
| 3c | $NaOCH_3$ | Isolated | None | 39.6 | Y |
| 2a | Na - Metal | Isolated | None | 0.1 | — |
| 2b | Na - Metal | Isolated | Incipient Distilled | 4.2 | <A |
| 2c | Na - Metal | Isolated | 16% distilled-off | 8.4 | <A |
| 5a | Na - Metal | In Situ | 17% distilled-off | 12.7 | — |
| 5b | Na - Metal | In Situ | 39% distilled-off | 16.2 | D |
| 5c | Na - Metal | In Situ | None | 0.4 | — |

TABLE II

POLYMERIZATION OF PYRROLIDONE WITH POTASSIUM-DERIVED CATALYST

| Example | Catalyst Source | Catalyst Preparation | Treatment of Polymerizate | Product Percent Conversion | Viscosity |
|---|---|---|---|---|---|
| 6a | KOH | In Situ | Incipient Distillation | 49.2 | $Z_2$ |
| 6c | KOH | Isolated | None | 53.3 | $Z_1$ |
| 7 | K - Metal | In Situ | None | 15.1 | B |
| 9a | K - Metal | Isolated | None | 49.3 | X - Y |
| 9b | K - Metal | Isolated | Incipient Distillation | 55.4 | X - Y |
| 9c | K - Metal | Isolated | Distilled off 23% | 56.9 | X - Y |

Under polymerization conditions in which 30° reaction mixture comprising about 10 mol percent of an alkaline catalyst derived 50° an alkali metal compound and about 3 mol percent of carbon dioxide added thereto based on total monomer, is polymerized for about 22 hours at a temperature of monomer. 50° C, satisfactory polymer yields are those corresponding to about 30% or more conversion of monomer and preferably about 40% or more conversion. A satisfactory catalyst will produce satisfactory polymer yields under these conditions.

Examination of Tables I and II shows that potassium metal-derived catalysts for the polymerization of 2-pyrrolidone when prepared by a process comprising the step of substantially isolating the catalyst are satisfactorily effective catalysts in that satisfactory yields of polymer are obtained (i.e., at least 30% or more conversion of monomer under these conditions). However sodium metal-derived catalysts subjected to identical isolating steps are shown to be much less effective catalysts in that less satisfactory yields of polymer are obtained under conditions identical to the potassium metal-derived catalyst polymerization.

The tables also show that satisfactory catalysts can be made from sodium derivatives (e.g. $NaOCH_3$, NaOH) and potassium derivatives (e.g. KOH) without the use of a process step comprising substantial isolation of the catalyst. Finally, Table II shows that a potassium metal-derived catalyst not subjected to a process step of substantial isolation of the catalyst is unsatisfactory.

What is claimed is:

1. A process for preparing fiber-forming polypyrrolidone which comprises contacting 2-pyrrolidone under polymerization conditions with a solid catalyst, comprising potassium pyrrolidonate and an adduct of potassium pyrrolidonate with carbon dioxide, wherein the solid catalyst is prepared by steps comprising (a) contacting metallic potassium with an equivalent or excess amount of 2-pyrrolidone to form potassium pyrrolidonate; (b) contacting the potassium pyrrolidonate, in a non-solvent for potassium pyrrolidonate and its carbon dioxide adduct, with about 5 to 60 mol percent, based on said pyrrolidonate, of carbon dioxide to thereby obtain a precipitate comprising the solid catalyst; and (c) mechanically separating the precipitate from the non-solvent to thereby obtain the solid catalyst.

2. The process in claim 1 wherein said non-solvent for potassium pyrrolidonate and its adduct with carbon dioxide is a monocyclic hydrocarbon of at least 6 carbon atoms.

3. The process of claim 2 wherein said hydrocarbon is benzene.

* * * * *

UNITED STATES PATENT AND TRADEMARK OFFICE
CERTIFICATE OF CORRECTION

PATENT NO. : 4,125,523
DATED : November 14, 1978
INVENTOR(S) : ROBERT BACSKAI

It is certified that error appears in the above-identified patent and that said Letters Patent are hereby corrected as shown below:

Column 1, line 19 "cataylst" should read --catalyst--.
Column 1, line 29 "$Na^{3\,0}+$" should read --$Na^{++}$--.
Column 1, line 30 "2H+" should read --$2H^{++}$--.
Column 1, line 44 "lactum" should read --lactam--.
Column 2, line 42 "mol; ratio" should read -- mol ratio--.
Column 3, line 12 "pryylidone" should read --pyrrolidone--.
Column 3, line 20 "catalysts" should read --catalysis--.
Column 3, line 29 "$SO_2$" should read --$SO_2$ and $CO_2$--.
Column 3, line 30 "(U.S.)" should read --(U.S.--.
Column 3, line 49 "perferred" should read --preferred--.
Column 3, line 55 "toal" should read --total--.
Column 3, line 66 "alakline" should read --alkaline--.
Column 4, line 54 "Example 1b" should read --Example 1a--.
Column 4, line 59 "ws" should read --was--.
Column 6, line 5 "temperture" should read --temperature--.
Column 6, line 16 "1.38 G" should read --1.38 g--.
Column 8, line 40 "110/total" should read --100/total--.
Column 9, line 12 "30°" should read --a--.
Column 9, line 14 "50°" should read --from--.
Column 9, line 17 "of monomer 50°C" should read --of 50°C--.
Column 10, line 32 "in" should read --of--.

Signed and Sealed this

Eighteenth Day of September 1979

[SEAL]

Attest:

LUTRELLE F. PARKER

Attesting Officer  Acting Commissioner of Patents and Trademarks